(12) United States Patent
Kolawa et al.

(10) Patent No.: US 8,205,191 B1
(45) Date of Patent: Jun. 19, 2012

(54) SYSTEM AND METHOD FOR CHANGE-BASED TESTING

(75) Inventors: Adam K. Kolawa, Bradbury, CA (US); Wayne P. Ariola, Jr., Los Angeles, CA (US); Marek Michal Pilch, Durate, CA (US)

(73) Assignee: Parasoft Corporation, Monrovia, CA (US)

( * ) Notice: Subject to any disclaimer, the term of this patent is extended or adjusted under 35 U.S.C. 154(b) by 1457 days.

(21) Appl. No.: 11/739,036

(22) Filed: Apr. 23, 2007

Related U.S. Application Data

(60) Provisional application No. 60/810,287, filed on Jun. 2, 2006.

(51) Int. Cl.
*G06F 9/45* (2006.01)
(52) U.S. Cl. ....................................................... 717/124
(58) Field of Classification Search .................. 717/124
See application file for complete search history.

(56) References Cited

U.S. PATENT DOCUMENTS

| | | | |
|---|---|---|---|
| 5,615,333 A * | 3/1997 | Juettner et al. | 714/38.13 |
| 5,673,387 A | 9/1997 | Chen et al. | |
| 6,405,364 B1 * | 6/2002 | Bowman-Amuah | 717/101 |
| 2007/0038977 A1 * | 2/2007 | Savage | 717/106 |
| 2007/0285556 A1 * | 12/2007 | Nakahara | 348/345 |

* cited by examiner

*Primary Examiner* — John Chavis
(74) *Attorney, Agent, or Firm* — Christie, Parker & Hale, LLP.

(57) ABSTRACT

A method and system for assessing effect of a change in a computer software including a plurality of requirements and a plurality of test cases. The method and system include: changing a requirement from the plurality of requirements; correlating the computer software with the changed requirement to identify a portion of the computer software that is affected by the changed requirement; and correlating one or more of the test cases with the portion of the computer software that is affected to identify one or more of the test cases that is affected by the changed requirement.

Additionally, the computer software may be changed and the effect of that change on the requirements and the test cases may then be determined.

18 Claims, 23 Drawing Sheets

FIG. 4

REQUIREMENT MANAGEMENT project 1

Project 1 details:

Name: Project name 1

List of FR's for this project:

Display: ☐ not implemented    ☒ Implemented
         ☒ not Fixed          ☐ Fixed

| FR ID | FR Description | Status | Closed Date |
|-------|----------------|--------|-------------|
| 1.4.1 | Description of feature 1 | Implemented | 4/03/2006 |
| 1.4.2 | Description of feature 2 | not fixed | n/a |
| 1.4.3 | Description of feature 3 | fixed | 2/11/2006 |
| 1.4.4 | description of feature 4 | not fixed | n/a |

Requirement 142 details:

Name: Dashboard Access
Status: UNRESOLVED
State : In-Progress
Related Code status: PART OF CODE [display code]
Assigned to: name@parasoft.com, name@parasoft.com Bugzilla ID link
Wiki description page

FIG. 6B

| Use Cases for this Requirement | | | | | | | |
|---|---|---|---|---|---|---|---|
| UC ID | Author | Comments | Start | Finish | State | # test scen. | # updates |
| 14281 | name | Arch/Man exclusive acc. | 4/12/2006 | 4/13/2006 | Retest | 3 | 3 |
| 14282 | name | second scenario | 4/14/2006 | 4/15/2006 | in-progress | 0 | 0 |
| 14283 | name | third scenario | 4/15/2006 | 4/16/2006 | Closed | 1 | 0 |

FIG. 7

Requirement Definition:

Requirement name: Dashboard Access
Requirement version: 1
Created by: name
Created on: 11/02/2008

Project: QR821  NOTE: Project can be changed only in "Clone" mode.

[Save] [Refresh View]

Requirement description:

Different roles should have access only to their own dashboards.

FIG. 8

Requirement modification History

[Compare checked]

☑ **version 8 - *Modif. Description - Current***

☐ version 7 - Modif. Description

☐ version 6 - Modif. Description

☐ version 5 - Modif. Description

☐ version 4 - Modif. Description

☐ version 3 - Modif. Description

☐ version 2 - Modif. Description

☑ version 1 - Modif. Description - Initial

Use Case 1.4.2.8.1 details:

Name: Arch/Man exclusive acc.
Status: Use Case Description update
State : RETEST - REOPEN
Related Code status: ALL CODE [display code]
Assigned to: name@parasoft.com, name@parasoft.com

FIG. 11

Test scenarios for this Use Case

| TS ID | Author | Comments | Start | Finish | State | # test cases | # updates |
|---|---|---|---|---|---|---|---|
| 1428111 | name | first scenario | 4/12/2006 | 4/13/2006 | Retest | 3 | 3 |
| 1428121 | name | second scenario | 4/14/2006 | 4/15/2006 | In-progress | 0 | 0 |
| 1428131 | name | third scenario | 4/15/2006 | 4/16/2006 | Closed | 1 | 0 |

Test Scenario 1428111 details.

Name: First Scenario
Status: Tested
State : Closed
Related Code status: ALL CODE [display code]
Assigned to: name@parasoft.com, name@parasoft.com

FIG. 16

Test Cases for this Test Scenario:

| TC ID | Author | Name | Comments | Start | Finish | State | #TC Runs |
|---|---|---|---|---|---|---|---|
| 1428111131 | name | first test case | | 4/12/2006 | 4/13/2006 | Retest | 2 |
| 1428111132 | name | second test case | | 4/14/2006 | 4/15/2006 | In-progress | 0 |
| 1428113133 | name | third test case | | 4/15/2006 | 4/16/2006 | Closed | 1 |

Test Case 142811131 details:

Name: First Scenario
Status: Tested
State : Closed
Related Code status: ALL CODE [display code]
Assigned to: name@parasoft.com, name@parasoft.com

FIG. 22

| Other Test Cases for Test Scenario 14281113: | | | | | | | |
|---|---|---|---|---|---|---|---|
| TC ID | Author | Name | Comments | Start | Finish | State | #TC runs |
| 142811131 | name | first test case | | 4/12/2006 | 4/13/2006 | Retest | 2 |
| 142811132 | name | second test case | | 4/14/2006 | 4/15/2006 | In-progress | 0 |
| 142813133 | name | third test case | | 4/15/2006 | 4/16/2006 | Closed | 1 |

FIG. 23

Test Case Definition:
 Test Case name : First Test Case
 Test Case run : 2
 Created by : name
 Created on : 11/02/2006
 Start on : 4/12/2006 7:32:54AM 1) Log in as architect.
 ✓ ok 2) Look at main page. Project manager icon should be gray and
 ✓ not clickable.
 done.
 [View Attach. (2)]

3) Check menu Dashboards - there shulf be no "project manager"
 Item.
 finished..
 [View Attach. (1)]

Commment: Test Passed with
 Status: Tested
 Finished: 4/13/2006 01 03:45AM

FIG. 24

| REQUIREMENT MANAGEMENT | | | | | | | | |
|---|---|---|---|---|---|---|---|---|
| Project | | | | | | | | |
| project 1 | | | | | | | | |

List of Test Cases that have to be retested because of source code change

| FR | Use Case | Test Scenario | Test Case | Assigned to | File Name | Class | Meth/Func | Last Test dur |
|---|---|---|---|---|---|---|---|---|
| 1428 | 142811 | 14281113 | 142811131 | tester name | file1.cpp | class11 | function111 | 1h23' |
| 1428 | 142811 | 14281113 | 142811131 | tester name | file2.cpp | class21 | function211 | 48' |
| 1428 | 142811 | 14281113 | 142811131 | tester name | file2.cpp | class22 | function221 | 1d3h11' |
| 2615 | 261523 | 26152316 | 261523164 | tester name 2 | file6.cpp | class68 | function683 | 17' |
| Total: 2 | 2 | 2 | 2 | 2 | 3 | 4 | 4 | 1d5h39' |

FIG. 28

| REQUIREMENT MANAGEMENT | | | | | | | | |
|---|---|---|---|---|---|---|---|---|
| Project | version | | | | | | | |
| project 1 | 1.4 | | | | | | | |

What one have to retest if I modify: Function — function221
 (Function / Method / Class / File)

List of Test Cases that have to be retested because of source code change

| FR | Use Case | Test Scenario | Test Case | Assigned to | File Name | Class | Meth/Func | Last Test dur |
|---|---|---|---|---|---|---|---|---|
| 1428 | 142811 | 14281113 | 142811131 | tester name | file2.cpp | class22 | function221 | 1d3h11' |
| 2615 | 261523 | 26152316 | 261523164 | tester name 2 | file2.cpp | class22 | function221 | 17' |
| Total: 2 | 2 | 2 | 2 | 2 | 1 | 1 | 1 | 1d3h28' |

FIG. 29

SYSTEM AND METHOD FOR CHANGE-BASED TESTING

CROSS-REFERENCE TO RELATED APPLICATIONS

This Patent Application claims the benefit of the filing date of U.S. Provisional Patent Application Ser. No. 60/810,287, filed on Jun. 2, 2006 and entitled "SYSTEM AND METHOD FOR CHANGE-BASED TESTING," the entire content of which is hereby expressly incorporated by reference. This Patent Application is also related to U.S. patent application Ser. No. 11/282,542, filed on Nov. 17, 2005, entitled "SYSTEM AND METHOD FOR GLOBAL GROUP REPORTING," the entire content of which is hereby expressly incorporated by reference.

FIELD OF THE INVENTION

The present invention relates generally to testing computer software; and more particularly to a system and method for change-based testing.

BACKGROUND OF THE INVENTION

The problem of writing error-free computer programs has plagued programmers since the beginning. Sophisticated schemes for automatically discovering program errors and bugs of all kinds, including lexical, syntactic, semantic and logical, have been developed.

Most of software developers understand that the longer an error is allowed to remain in the software before it is discovered, the more expensive it becomes to fix. With vigilant testing from the earliest phases of the software lifecycle, software development teams find errors earlier and reduce the likelihood of discovering the error further down in the software lifecycle. Early detection reduces the cost of fixing each error, which in turn, reduces the cumulative cost of fixing the thousands of errors that typically surface in the course of a project. Considering the costs an organization would incur if even few errors were not found until late in the lifecycle, it is clear that early detection of errors yields a substantial cost benefit.

When a software development team has an automated and comprehensive method for preventing errors throughout the lifecycle of the software product, the team typically prevents hundreds or even thousands of errors from occurring throughout a project. As a result, the team has significantly fewer errors to find and fix, which translates to reduced costs and a more rapid, efficient development process.

SUMMARY

In one embodiment, the present invention is a method and system for assessing effect of a change in a computer software including a plurality of requirements and a plurality of test cases. The method and system include: changing a requirement from the plurality of requirements; correlating the computer software with the changed requirement to identify a portion of the computer software that is affected by the changed requirement; and correlating one or more of the test cases with the portion of the computer software that is affected to identify one or more of the test cases that is affected by the changed requirement.

In one embodiment, the present invention is a method and system for assessing effect of a change in a computer software including a plurality of requirements and a plurality of test cases. The method and system include: changing a portion of the computer software; correlating the changed portion of the computer software with one or more requirements to identify which requirements are affected by the changed portion of the computer software; and correlating the changed portion of the computer software with one or more of the test cases to identify which test cases are affected by the changed portion of the computer software.

In one embodiment, the present invention is a method and system for assessing effect of a change in a computer software. The method and system include: providing a plurality of requirements for the computer program for obtaining a desired test coverage; providing a plurality of test cases related to the computer program; modifying a requirement from the plurality of requirements; and identifying one or more test cases from the plurality of test cases and one or more requirements from the plurality of requirements that are affected by the modified requirement.

BRIEF DESCRIPTION OF THE DRAWINGS

FIG. 4 is an exemplary Requirements Management Sub-menu, according to one embodiment of the present invention;

FIG. 5 is an exemplary Projects Page, according to one embodiment of the present invention;

FIGS. 6A and 6B are exemplary Requirements page and Requirements Details, according to one embodiment of the present invention;

FIG. 7 is a screen showing exemplary use cases for FIGS. 6A and 6B, according to one embodiment of the present invention;

FIG. 8 is an exemplary screen for Requirement Definition section, according to one embodiment of the present invention;

FIG. 9 is an exemplary screen for Requirement Modification History, according to one embodiment of the present invention;

FIG. 10 is an exemplary screen for Use Cases page, according to one embodiment of the present invention;

FIG. 11 is an exemplary screen for Use Cases Details section, according to one embodiment of the present invention;

FIG. 12 shows an exemplary screen for Test Scenarios page, according to one embodiment of the present invention;

FIG. 13 shows an exemplary screen for Use Case Definition section, according to one embodiment of the present invention;

FIG. 14 shows an exemplary screen for Use Case Modification History, according to one embodiment of the present invention;

FIG. 15 shows an exemplary screen for Test Scenarios page, according to one embodiment of the present invention;

FIG. 16 shows an exemplary screen for Test Scenarios Details section, according to one embodiment of the present invention;

FIG. 17 shows an exemplary screen for Test Cases for the Test Scenario section of FIG. 16, according to one embodiment of the present invention;

FIG. 18 depicts an exemplary screen for Test Scenario Definition section, according to one embodiment of the present invention;

FIG. 20 illustrates an exemplary screen for Requirement Management Compare page, according to one embodiment of the present invention;

FIG. 21 depicts an exemplary screen for Test Cases page, according to one embodiment of the present invention;

FIG. 22 shows an exemplary screen for Test Cases Details section, according to one embodiment of the present invention;

FIG. 23 shows an exemplary screen for Other Test Cases for a Test Scenario, according to one embodiment of the present invention;

FIG. 24 shows an exemplary screen for Test Case Definition section, according to one embodiment of the present invention;

FIG. 28 shows an exemplary screen for Change Base Testing page, according to one embodiment of the present invention; and FIG. 29 depicts an exemplary screen for Planning page, according to one embodiment of the present invention.

DETAILED DESCRIPTION

Figure 1:
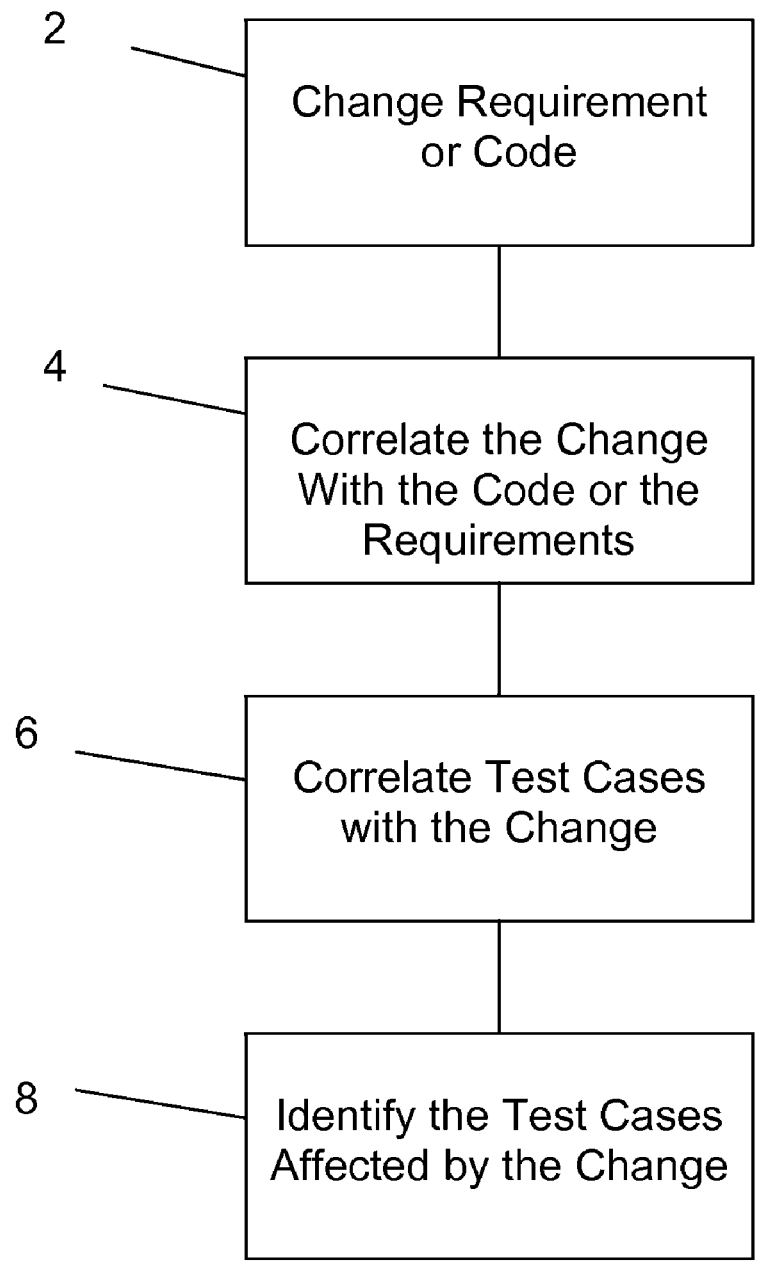
FIG. 1 is an exemplary process flow, according to one embodiment of the present invention.

FIG. 1 is an exemplary process flow, according to one embodiment of the present invention. In one embodiment, the present invention assesses the effect of a change in a computer software that includes requirements and test cases. In block 2, the invention changes a requirement or a portion of the computer software. In block 4, the invention correlates the computer software with the changed requirement (if a requirement was changed) or correlates the changed portion of the computer software with one or more requirements to identify a portion of the computer software that is affected by the changed requirement or identify the requirements that are affected by the changed portion of the computer software, as described in more detail below. In block 6, the invention then correlates some test cases with the portion of the computer software that is affected or changed and identifies one or more of the test cases that is affected by the change, in block 8, as described in more detail below.

Figure 2A:
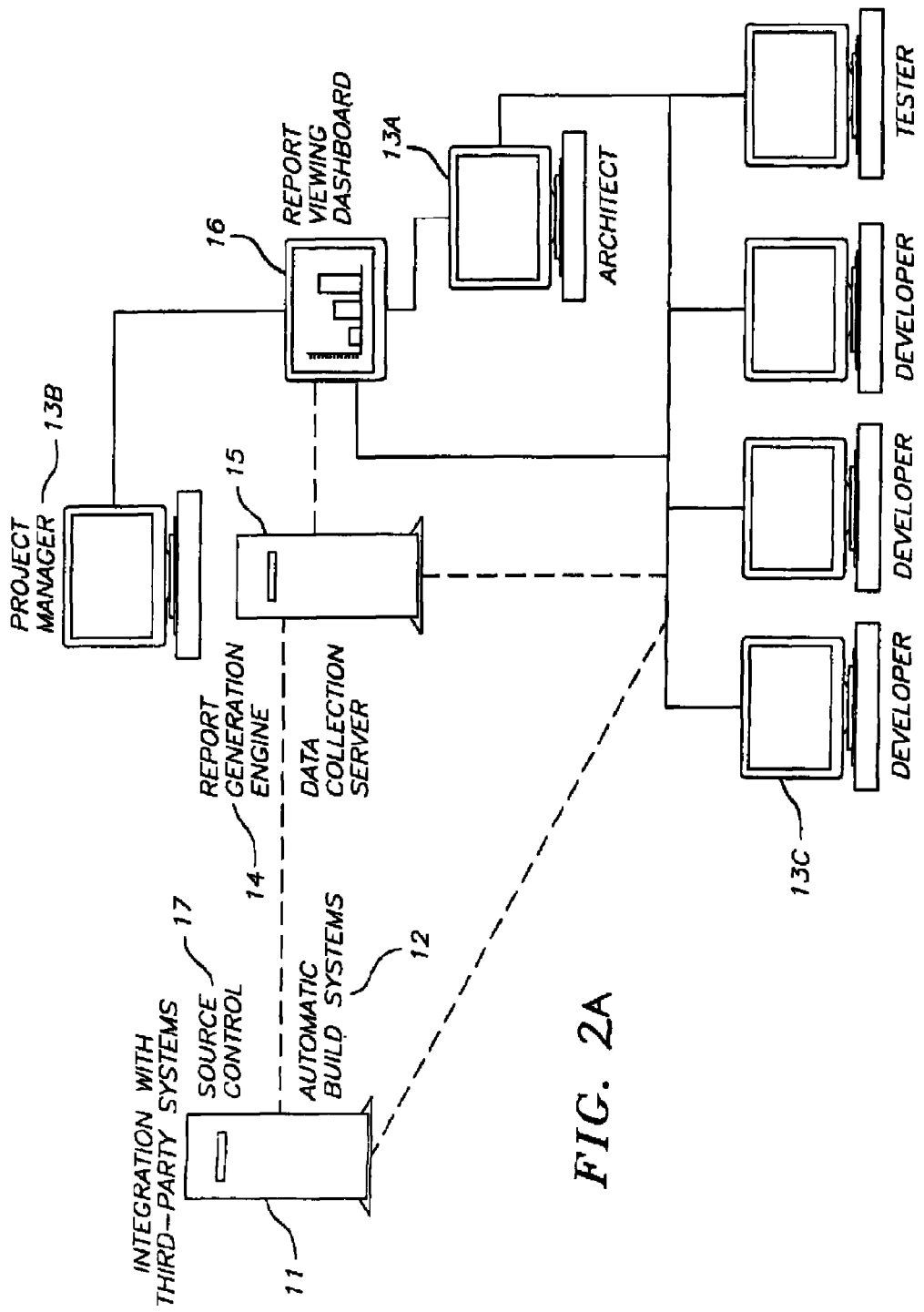
FIG. 2A is an exemplary system block diagram for automating reports, according to one embodiment of the present invention.

FIG. 2A is an exemplary system block diagram for automating reports. A Global Group Reporting System (GRS) 14 is an automated reporting structure that provides the data necessary to measure and evaluate how well the verification process, for example, Automatic Error Prevention (AEP) practices are working and disseminates that information to the proper management personnel. When this infrastructure is in place, up to the point of integrating GRS into the system, AEP practices are available throughout the software development lifecycle. GRS is capable of gathering useful and usable data from each point in the software lifecycle, storing the data in the data collection server 15, and distribute the data through reports to the roles and individuals to keep the development process running at its peak efficiency. The reports may be viewed by individuals 13a, 13b, and/or 13c, with different roles in a customized graphical user interface, for example, a report viewing dashboard 16. The data may be gathered from third party tools using third party tool interface 11, the build systems 12, and/or the source control 17. The nightly builds typically run without any human intervention.

Figure 2B:
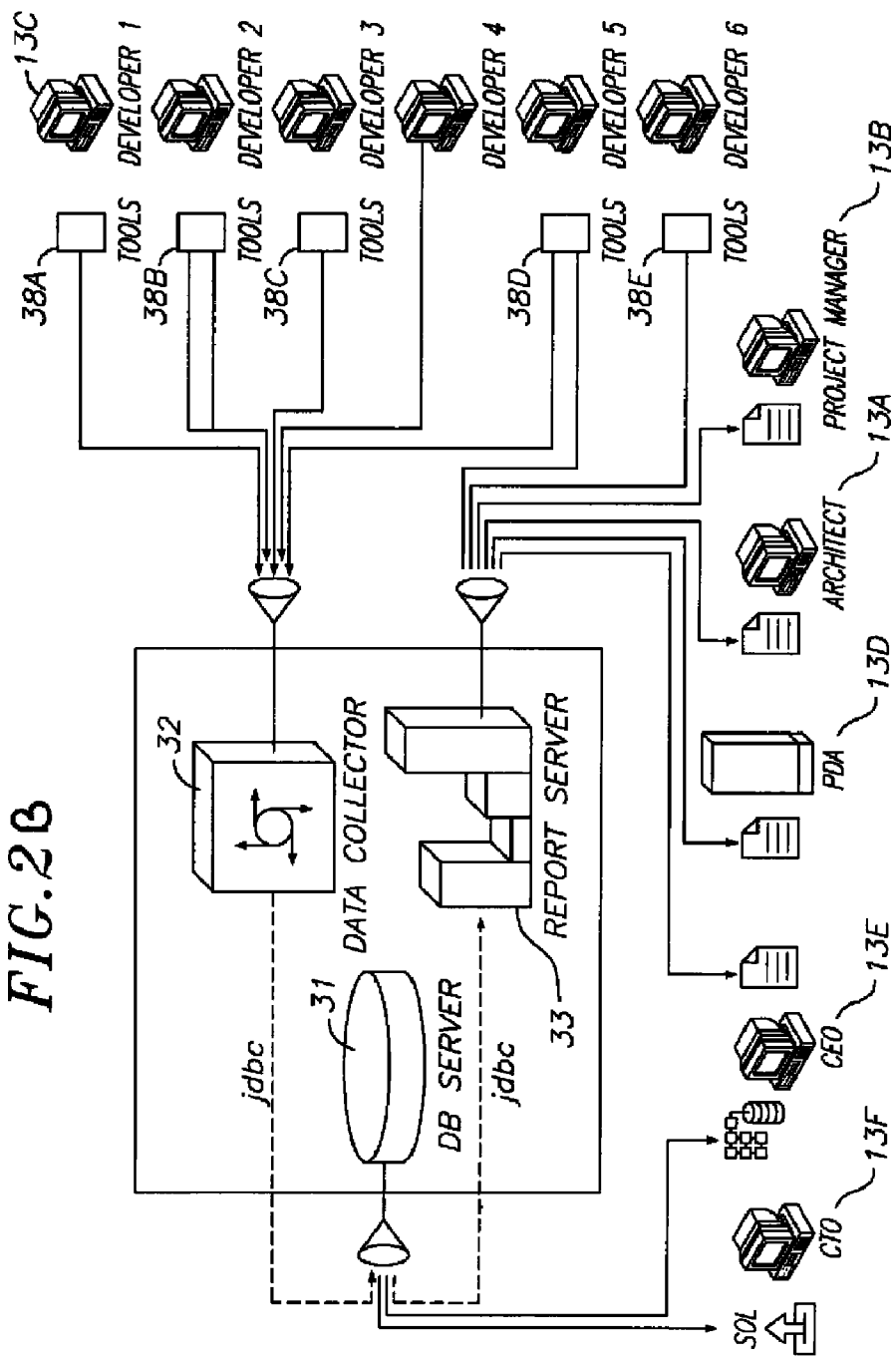
FIG. 2B illustrates an exemplary block diagram of a GRS, according to one embodiment of the present invention.

FIG. 2B illustrates an exemplary block diagram of a GRS. The GRS includes several functional parts. A database 31 (for example, relational database) stores information from executions of different testing tools, and data from various software tools and third party interfaces. All collected information is stored in the database and used for statistical analysis and historical system behavior. A data collector 32 receives data from different software tools, and third party interfaces. A reporting engine (server) 33 uses a web-based interface to offer the user a variety of statistical reports for data collected. In addition, the engine can gather information from other sources, such as a bug tracking system, and correlate all collected data into a single unit. The reporting engine 33 is capable of generating predefined views and reports for each roles, customizable views, and configurable graphical user interfaces (GUI) for each role. Third party tools can easily be adopted to send data to the collector as well. Prepackaged reports can be customized to emulate individual systems within the software development lifecycle.

Data from testing and monitoring tools 38a-38e (for example, Jtest™, C++ Test™, WebKing™, SOAtest™, CodeWizard™, DataRecon™, SOAPbox™, and WebBox™, from Parasoft Corp.®) is retrieved by the data collector 32 and stored in the relational database 31. In one embodiment, access to the database is through a set of standard reports targeted for the various roles (e.g., architect, project manager, developer, and so on) within the different AEP solutions that GRS supports (Java Solutions, Web Development Solutions, and so on). The GRS of the present invention is capable of interfacing with developers 13c, architect 13a, project manager 13b, a PDA 13d, CEO 13e, CTO 13f, and the like.

In one embodiment, access to GRS reports requires authorization with a login and password. Each GRS user account has a set of roles assigned to it. Once inside the system, the users are presented with a configurable dashboard that lets them visualize the status of their software development lifecycle. For example, a user with an appropriate access right can choose to view the behavior of the entire project, a development group, individual testers or programmers.

GRS tool provides flexibility by customizing prepackaged reports to a given role, which allows the user to view different aspects of their development process, or by tagging their data with various attributes that are used as filters when analyzing development and test results.

Attributes are used to drill down through the data using standard reports. If further customization is needed, a reports administrator can assign new attributes to a name, either a fixed or variable value, depending upon the types of reports needed for analysis, resulting in total customization of the scope of reports available.

GRS allows slicing through test data in a variety of different ways, maximizing the understanding of how well the application is progressing towards release, what tasks remain, and any problems that have arisen during testing. When a standard report is accessed, it may be shown in graphic form. The user can click on this graphic to retrieve the data in an easy to read text format. Standard reports also include multiple data sets collected from different runs of tools.

For example, for coding standards analysis, verification results or reports show adherence to coding rules and which rules were broken; for unit testing, reports show which test cases were run and provide information on test coverage; for bug tracking systems, reports can indicate the pace of bugs fixing, whether bugs are increasing or decreasing, and what software components are most responsible for bugs; and for monitoring systems, reports indicate how the monitoring system behaved during a given time period.

In one embodiment, GRS includes two levels of reporting that can be configured by the user. In the first level, the system can be configured to create reports from any activity at the developer desktop. For example, the architect and the developer can be automatically notified that there is a violation that needs to be addressed. This provides an instant report of errors and violations, but no analysis of improvement, relation to other developers, or relation to other projects. This level can provide a snapshot of the activity just completed by the developer.

Figure 3:
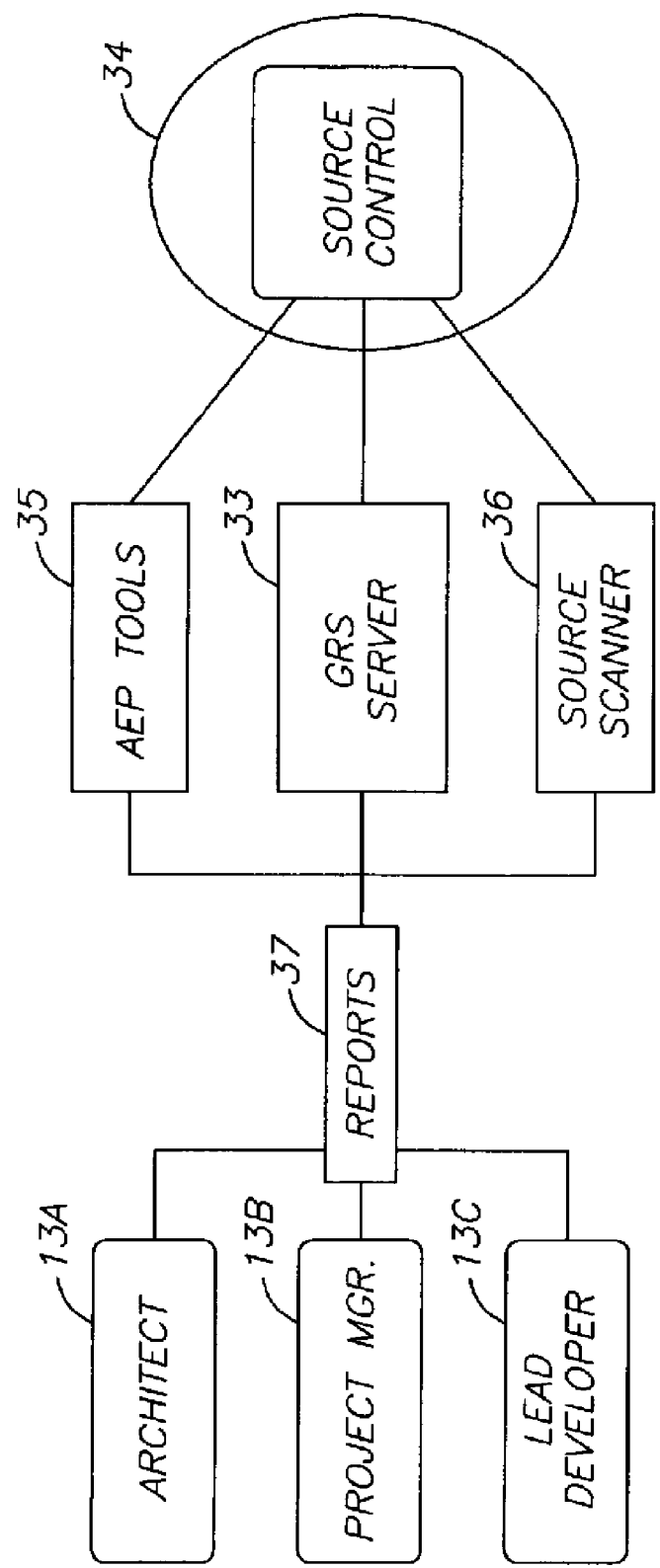
FIG. 3 illustrates an exemplary block diagram of a GRS for enterprise reporting, according to one embodiment of the present invention.

In the second level of reporting, GRS allows enterprise reporting, as shown in FIG. 3. In this case, GRS includes an enterprise reporting server 33 that in one embodiment, includes a relational database tied to report processing and publishing engines. Because the server includes a relational database, it allows capturing large amounts of data about the code base and about team activity, and view it in a variety of ways. Those skilled in the art would appreciate that the relational database does not need to be part of the server 33 and can be located in one or more servers. Typically, the server is integrated with the source control system 34. This allows data from source control (attributes such as the specific developer who checked in code that caused a violation) to be combined and correlated with data from all other software tools 35 during each point in lifecycle of a computer software to create a comprehensive view of the system. Server 33 also correlates the collected data to monitor the development of the computer software. In one embodiment, server 33 also correlates collected data from activities of assigned roles responsible for the development of the computer software from the computers of the assigned roles with the collected data from the software tools, for example, to asses validity of their activities.

In one embodiment, the correlated data is used to monitor compliance of an organization with a given regulation, to asses workload, distribution of tasks and performance of users to manage the development process of the computer software, and to manage quality of the development of the computer software. Furthermore, a confidence factor can be generated from the collected data and displayed the in a GUI that is customized for a respective role.

Source scanner 36 scans, for example, the file headers stored in the source control 34, and determines who checked in the file, when the file was checked in, and other similar information. Source scanner 36 then feeds this information to the AEP tools 35 for nightly builds and other tools' usages. The nightly builds run without any human intervention because, as mentioned above, the AEP tools are capable of generating their own test cases, without any prior knowledge of the code. In other words, the AEP tools apply a rule-base system to the code without any human intervention for generating test cases.

The results of the nightly build run is then stored in the database of the GRS server 33. The results are then processed to generate reports 37 and an objective indication of the code quality. In one embodiment, this objective indication of the code quality is a confidence factor, as described below in more detail. The objective indication of the code quality is a quality rating of the entire code that takes into account the verification results of each of the verification tools, the number of test cases run, the success of failure of the test cases, with respective to each developer and the entire development team.

The enterprise reporting server is pre-configured to receive data from many different software tools. The server also automatically receives data from all automatic builds. The server is an open platform that can be configured to collect data from a variety of other systems, such as bug tracking systems, allowing the users to see who's working on code and how many bugs are being reported, as well as view the correlation between bugs and the current development practices. The server can also be connected to existing test suites (such as JUnit™) or those from other testing products that output a text file. As the number of sources for relevant data included in the system are increased, the users' ability to correlate information about the development process, code, and quality will increase. This information can be used to create reports that correlate the number of lines of code to the amount of bugs, the improvement within specific development teams, or even the progress of individual developers. Most importantly, once the enterprise reporting server is in place, the users have an open platform that can be configured to accept data from any variety of tools to help them better manage their entire software lifecycle.

In one embodiment, the GRS is pre-configured with sets of reports for the various roles (for example, reports for the developers, architect, and/or project manager). In one embodiment, GRS is an open system that can connect to other systems and can accept output from other tools. This means that when used apart from the AEP systems, the general reporting engine can generate customized reports. The reports generated by GRS can correlate information from different phases of the software development lifecycle and support error prevention for the entire lifecycle. For example, information from monitoring can be correlated to particular pieces of developed code in an effort to pinpoint problems and prevent certain errors from occurring.

In one embodiment, a variety of standard reports are included with the enterprise reporting server, accessible using a standard web browser. Based on a login, users are presented with a dashboard (GUI) that shows them relevant information based on their role within the system. Developers are able to view different types of graphs which that show how well they performed on achieving coverage of the rules, which rules where used during statistical analysis, which passed and failed, and where they failed. They can also view which pieces of code are failing the most.

In one embodiment, the present invention extends the functionality of a group reporting system a robust requirement management engine. In addition to a GRS, the present invention functions as a requirements management system (RMS) connected to a source code and testing the source code. A Requirements page indicates what has been tested and when it was tested.

The present invention, in an effective way indicates how changing requirements affect source code. In other words, if a user modifies a requirement, the present invention is capable of tracking which requirements were affected through the source code. Therefore, the present invention keeps track of which test cases that are related to the source code of these requirements need to be retested.

This focuses the efforts of a quality assurance (QA) team by reducing the amount of testing performed after any modifications are made to requirements, test cases, use cases, test scenarios, or test cases.

In one embodiment, managing requirements includes managing the following information:

Projects: Plan to be carried out for completion of a product.

Requirements: Specifications that have been carefully thought through to reach completion of a project.

Use Cases: True-to-life desired goal to be achieved by implementing the requirement.

Test Scenarios: Descriptions of how use case should be tested.

Test Cases: Step-by-step account of how the test scenario of a use case was actually tested. This description may include screen shots.

In one embodiment, the system and method of the present invention defines projects by multiple requirements. Each requirement may be defined by multiple use cases. Each use case may be defined by multiple test scenarios. Each test scenario may be tested using multiple test cases.

Figure 4:
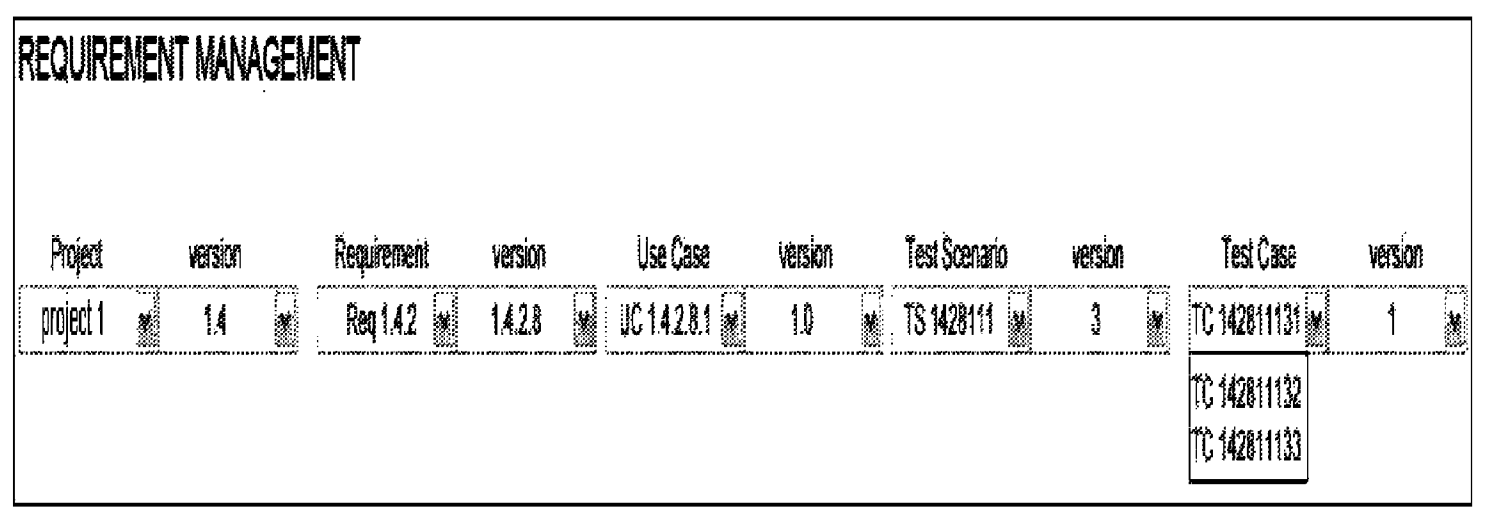

In one embodiment, from a Requirements Management pages, users can choose the appropriate project. FIG. 4 is an exemplary Requirements Management Submenu. When viewing requirement management information in a GRS, the Requirements Management submenu can be used as a guide. It reveals what is displayed on the page. In addition, users can change the information that is displayed by making the appropriate selections from s drop-down menus. For example, in FIG. 4, "Test Case (TC) 142811131, Version 1" would be displayed. If an item higher in the requirement management hierarchy is selected, anything lower in the hierarchy is grayed out as where Requirement 1.4.2, Version 1.4.2.8 is selected.

Projects are plans to be carried out in order to complete the development of a product. In one embodiment, the Projects page looks similar to FIG. 5. The selected project name is displayed in a Name field. Below it, a table lists the following information: FR ID (identification number assigned to the listed feature/requirement and FR Description (brief details about the listed feature/requirement).

Current condition of the listed feature/requirement is also displayed as the status. Following are the some possible statuses:

Not Implemented: Feature/requirement has been requested, but no use cases, test scenarios nor test cases have been defined, yet.

Implemented: All use cases, test scenarios, and test cases have been defined, tested, passed testing, and closed.

Not Fixed: Previously implemented, but re-opened.

Fixed: Re-opened, updated, and closed, again.

Closed Date: Date on which the listed feature/requirement was implemented/fixed. If still in-progress, N/A is displayed.

The list displayed in the Projects table is intended for purposes such as release notes. Users can change the data that appears in the Projects table based on the selected Display options, which are the project statuses: Not Implemented, Implemented, Not Fixed and Fixed.

Figure 6A:
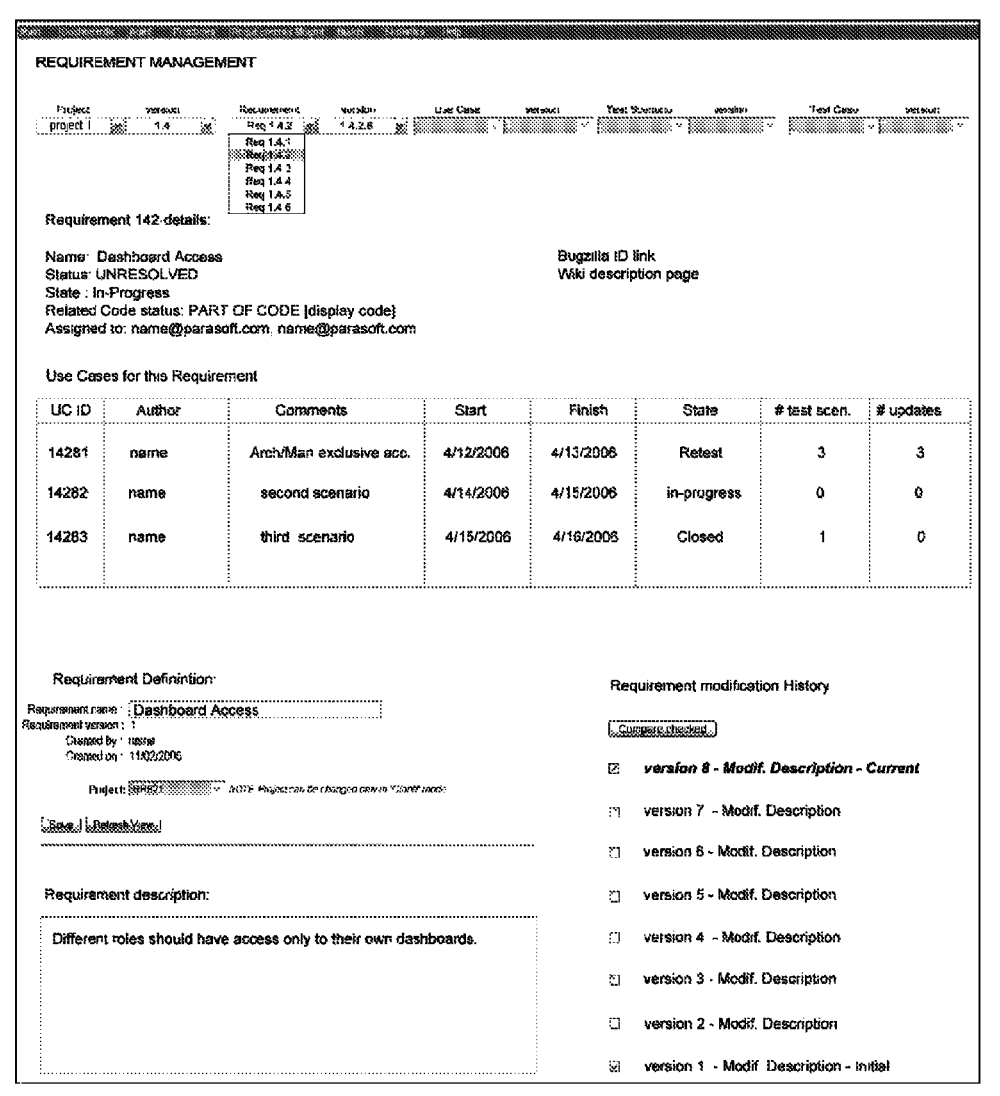

Requirements are specifications that have been carefully thought through in order to reach completion of a project. In one embodiment, the Requirements page is made up of the following sections, as shown in FIG. 6A: Requirements Details, Use Cases for this Requirement, Requirement Definition, and Requirement Modification History.

An exemplary Requirements Details section is shown in FIG. 6B. Based on the project and requirement selected from the Requirements Management submenu the Requirements Details section lists the following information:

Name: Descriptive title given to the displayed requirement.

Status: Current condition of the selected feature/bug, Possible statuses include: Unresolved, Updated, and Tested.

State: Current condition of the displayed requirement version. Possible statuses included:

In-progress: Not fully defined. In other words, not all use cases, test scenarios and test cases have been defined, yet. Also, a connection with all source code has not been established, yet.

Closed: All use cases, test scenarios, and test cases have been defined, tested, and passed testing. Also, no changes have been made to source code.

Retest/Reopen: An action affecting the requirement took place, for example, a new test case was created, test scenario was modified, or source code was changed after the requirement was already closed.

Related Code Status: Code that is affected by the modifications listed in the Requirement Modification History section. Click the [display code] link to open a list of all files, methods, and classes that are affected by the displayed requirements modifications.

Following are the two possible code statuses:

All: Indicates that connection with source code is completely established.

Partial: Indicates that connection with source code is not completely established, yet.

Assigned to: Developer to whom this requirement is assigned.

There are two links available in the Requirements Details section:

Bugzilla ID: Displays the Bugzilla number that was automatically assigned to the displayed requirement. Click to open the PR in Bugzilla. Bugzilla is server software designed to help you manage bug tracking process. Also can be used to track feature requests.

Wiki description page: Click to open details about the displayed requirement in Wiki. Wiki typically has many uses. In this case, Wiki is used as a collaboration server. It helps team members to share information about a project.

Exemplary use cases for this Requirement section are shown in FIG. 7. The use cases contain a table that lists all of the use cases that are related to the selected requirement. Following is some information listed in this table:

UC ID: Lists all of the use cases affected by the selected requirement. Click the appropriate identification name/number to open the Use Cases page shown in FIG. 10.

Author: Name of the user who created the listed use case.

Comments: Notes pertinent to the listed use case.

Start: Date and time on which testing using the listed use case began.

Finish: Date and time on which testing using the listed use case was completed.

State: Current condition of the displayed requirement version, Possible statuses include:

In-progress: Not fully defined. In other words, not all use cases, test scenarios and test cases have been defined, yet. Also, a connection with all source code has not been established, yet.

Closed: All use cases, test scenarios, and test cases have been defined, tested, and passed testing. Also, no changes have been made to source code.

Retest/Reopen: An action affecting the requirement took place, for example, a new test case was created, test scenario was modified, or source code was changed after the requirement was already closed.

test scen.: Total number of testing scenarios used against the displayed use case, which are listed in the Details section of Use Cases page shown in FIG. 11.

updates: Total number of modifications made to the listed use case. In other words, the total number of versions of the listed use case that exist.

FIG. 8 is an exemplary Requirement Definition section, according to one embodiment of the present invention. The Requirement Definition section displays the most current version of the selected requirement, by default. Users can change the displayed requirement from the following locations: Requirement drop-down list in the Requirements Management submenu, Requirement modification description link listed in the Requirement, and/or Modification History section Following is some information displayed in the Requirement Definition section:

Requirement name: Descriptive title given to the displayed requirement.

Requirement version: Version (modification) number of the selected requirement.

Created by: ID of the user who created the displayed version of the requirement.

Created on: Date and time on and at which the displayed version of the requirement was created.

Requirement description: Definition of the displayed requirement version, which should be should be carefully thought through in order to reach completion of the associated project.

FIG. 9 is an exemplary Requirement Modification History, according to one embodiment of the present invention. Any time that a requirement is modified, the method and system of the present invention create a new version of that requirement. The Requirement Modification History section lists all of the versions for the selected requirement.

Figure 20:
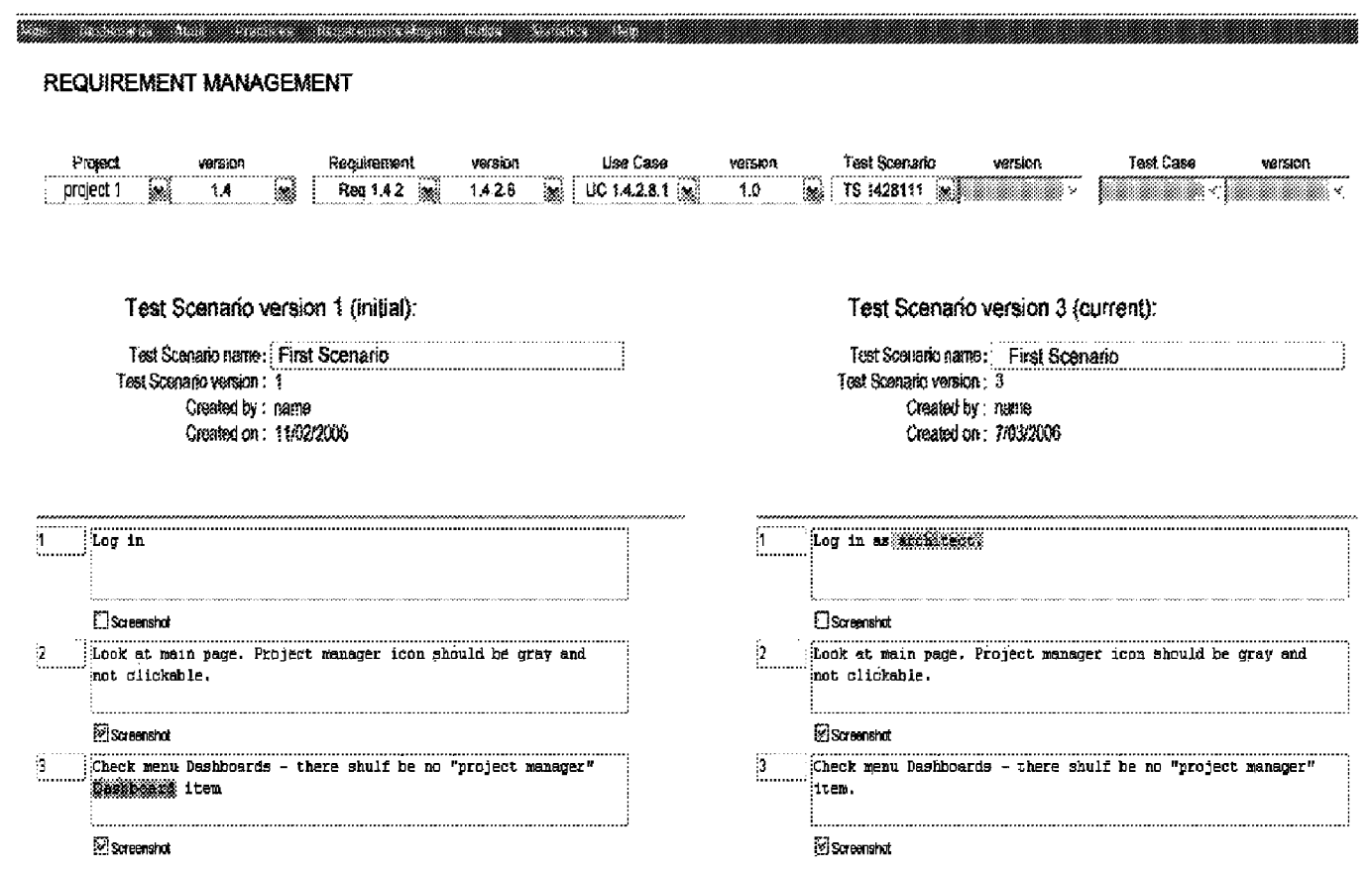

In one embodiment, from the Requirement Modification History section, users can perform the following functions: click a specific version (all listed versions are displayed as links) to display its definition in Requirement Definition section; and select the checkboxes that correspond with two different requirement versions to compare, and then click the Compare checked button. A page similar to page depicted in FIG. 20 is displayed in which the selected versions appear side by side with differences highlighted.

Figure 10:
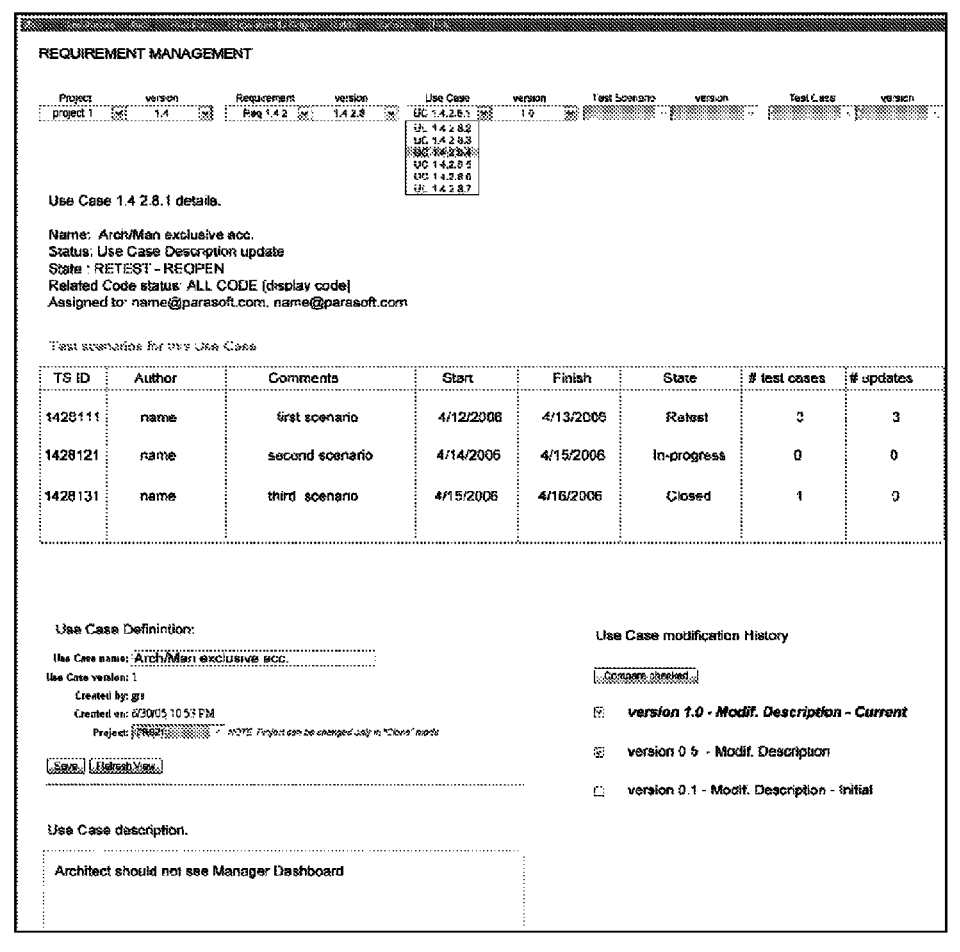

FIG. 10 is an exemplary Use Cases page, according to one embodiment of the present invention. Use cases are descriptions of the desired goal to be achieved by implementing the requirement. As shown, the Use Cases page is made up of Use Case Details, Test Scenarios for this Use Case, Use Case Definition, and Use Case Modification History.

An exemplary Use Cases Details section is shown in FIG. 11. Based on the project, requirement and use case selected from the Requirements Management submenu, the Use Case Details section lists the following information:

Name: Descriptive title given to the displayed use case.

Status [recommended change to: PR/FR Status]: Current condition of the selected feature/bug. Possible statuses include: Unresolved, Updated, and Tested.

State: Current condition of the displayed use case version. Possible statuses included:

In-progress: Not fully defined. In other words, not all use cases, test scenarios and test cases have been defined, yet. Also, a connection with all source code has not been established, yet.

Closed: All use cases, test scenarios, and test cases have been defined, tested, and passed testing. Also, no changes have been made to source code.

Retest/Reopen: An action affecting the requirement took place, for example, a new test case was created, test scenario was modified, or source code was changed after the requirement was already closed.

Related Code Status: Code that is affected by the modifications listed in the Use Case Modification History section. Click the "display code" link to open a list of all files, methods, and classes that are affected by the displayed use case modifications. Following are the two possible code statuses:

All: Indicates that connection with source code is completely established.

Partial: Indicates that connection with source code is not completely established, yet.

Assigned to: Developer to whom this use case is assigned. Test Scenarios for this Use Case.

FIG. 12 shows an exemplary Test Scenarios page, according to one embodiment of the present invention. The Test Scenarios page for this Use Case section contain a table that lists all of the test scenarios that are related to the selected requirement. Following is some information listed in this table:

TS ID: Lists all of the test scenarios affected by the selected requirement. Click the appropriate identification name/number to open the Test Scenarios page shown in FIG. 15.

Author: Name of the user who created the listed test scenario.

Comments: Notes pertinent to the listed test scenario.

Start: Date and time on which testing using the listed test scenario began.

Finish: Date and time on which testing using the listed test scenario was complete.

State: Current condition of the displayed use case version. Possible statuses included:

In-progress: Not fully defined. In other words, not all use cases, test scenarios and test cases have been defined, yet. Also, a connection with all source code has not been established, yet.

Closed: All use cases, test scenarios, and test cases have been defined, tested, and passed testing. Also, no changes have been made to source code.

Retest/Reopen: An action affecting the requirement took place, for example, a new test case was created, test scenario was modified, or source code was changed after the requirement was already closed.

test cases.: Total number of test cases written for the displayed test scenario, which are listed in the Details section of Test Scenarios page shown in FIG. 16.

updates: Total number of modifications made to the listed test scenario. In other words, the total number of versions of the listed test scenario that exist.

Figures 13, 14:
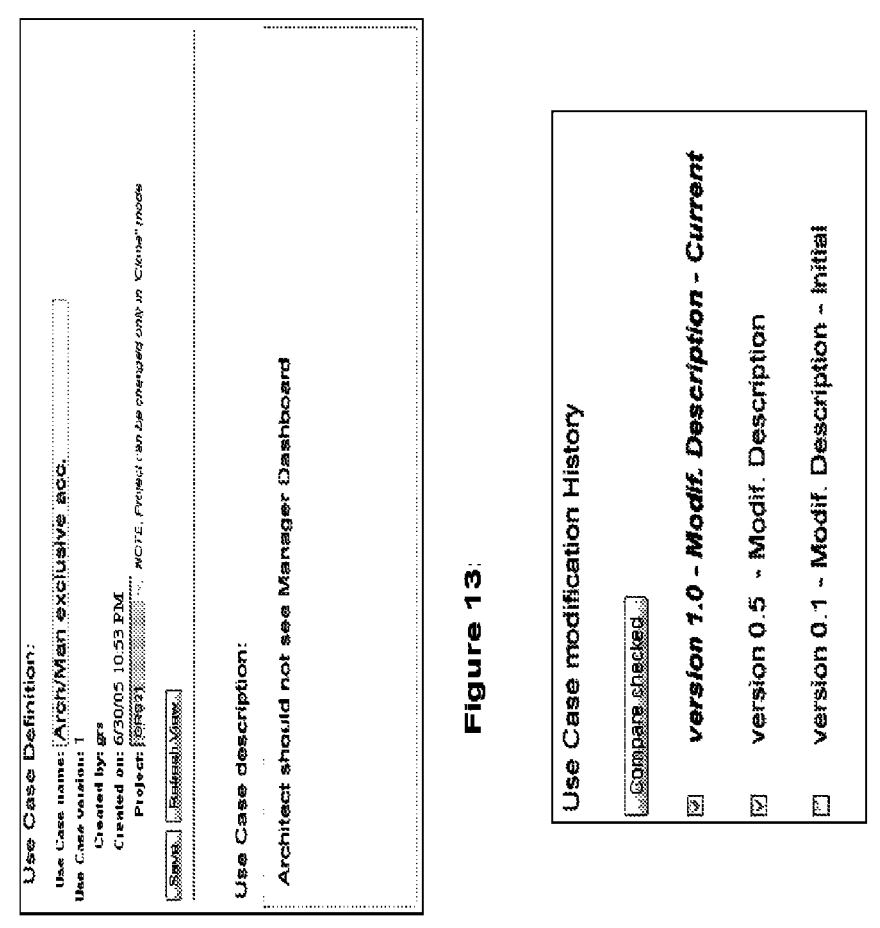

FIG. 13 shows an exemplary Use Case Definition section, according to one embodiment of the present invention. The Use Case Definition section displays the most current version of the selected use case, by default. Users can change the displayed use case from the following locations: Use Case drop-down list in the Requirements Management submenu, or Use Case modification description link listed in the Use Case Modification History section Following is some information displayed in the Use Case Definition section:

Use Case name: Descriptive title given to the displayed use case.

Use Case version: Version (modification) number of the selected use case.

Created by: ID of the user who created the displayed version of the use case.

Created on: Date and time on and at which the displayed version of the use case was created.

Project: Project to which the displayed use case version is associated.

Use Case description: True-to-life desired goal to be achieved by implementing the associated requirement.

From the Definition section users can perform the following functions:

Make any necessary modifications to create a new use case definition (and, in turn, a new use case version). Click Save to keep changes.

Click Refresh View to update the information displayed on the screen based on any changes that were saved.

FIG. 14 shows an exemplary Use Case Modification History, according to one embodiment of the present invention. Any time that a use case is modified, the system creates a new version of that use case. As shown, the Use Case Modification History section lists all of the versions for the selected requirement. From the Use Case Modification History section, users can perform the following functions:

Click a specific version (all listed versions are displayed as links) to display its definition in Use Case Definition section.

Select the checkboxes that correspond with two different use case versions to compare, and then click the Compare checked button. A page similar to the one depicted in FIG. 20 is displayed in which the selected versions appear side by side with differences highlighted.

Figure 15:
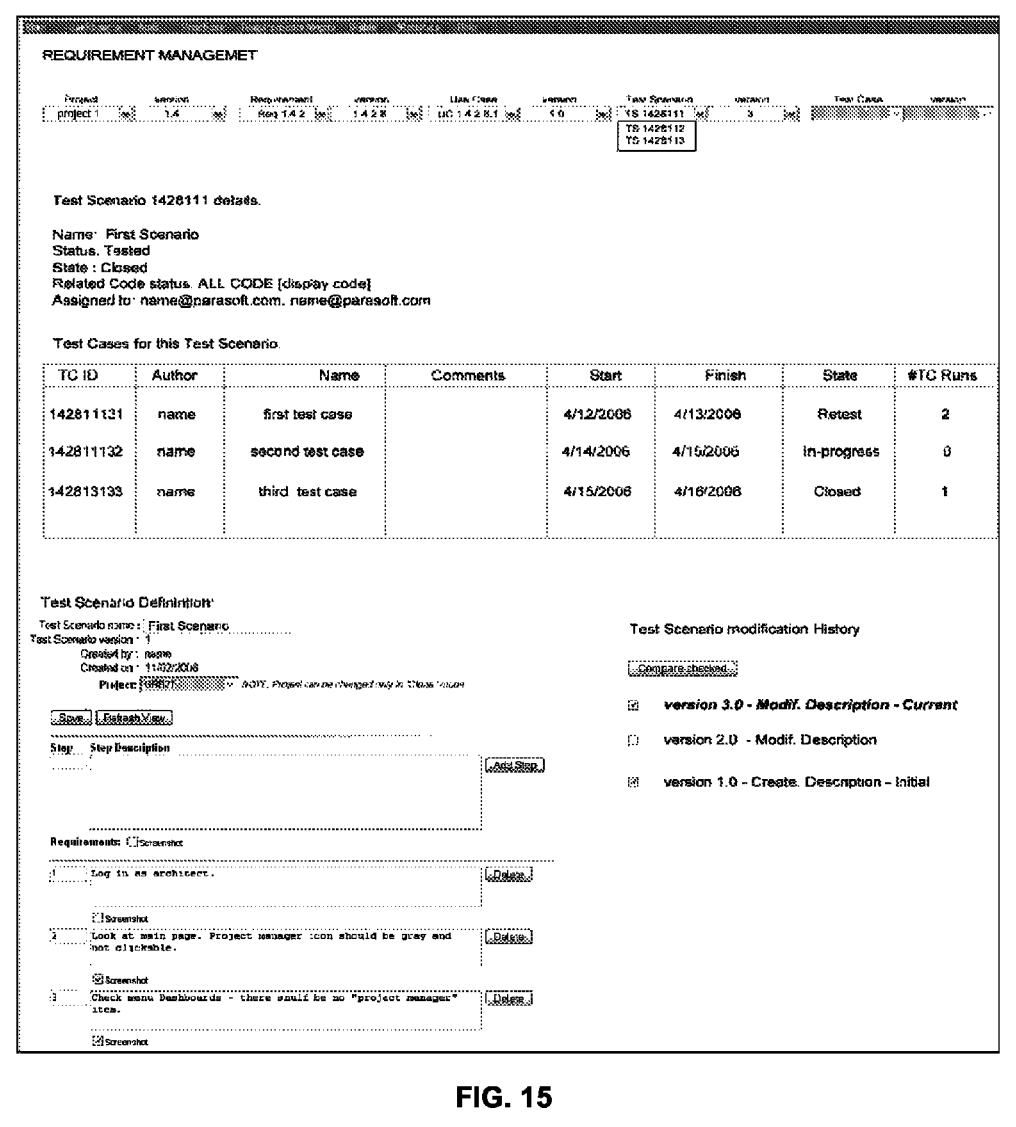

FIG. 15 shows an exemplary Test Scenarios page, according to one embodiment of the present invention. Test Scenarios are descriptions of how use cases will be tested. As shown, the Test Scenarios page is made up of the following sections: Test Scenarios Details, Test Cases for this Test Scenario, Test Scenario Definition, and Test Scenario Modification History.

An exemplary Test Scenarios Details section is shown in FIG. 16. Based on the project, requirement, use case and test scenario selected from the Requirements Management submenu, the Test Scenario Details section lists the following information:

Name: Descriptive title given to the displayed test scenario.

Status: Current condition of the selected feature/bug. Possible statuses include Unresolved, Updated, and Tested.

State: Current condition of the displayed test scenario version. Possible statuses included:

In-progress: Not fully defined. In other words, not all use cases, test scenarios and test cases have been defined, yet. Also, a connection with all source code has not been established, yet.

Closed: All use cases, test scenarios, and test cases have been defined, tested, and passed testing. Also, no changes have been made to source code.

Retest/Reopen: An action affecting the requirement took place, for example, a new test case was created or source code was changed after the requirement was already closed.

Related Code Status: Code that is affected by the modifications listed in the Test Scenario Modification History section. Click the "display code" link to open a list of all files, methods, and classes that are affected by the displayed test scenario modifications. Following are the two possible code statuses:

All: Indicates that connection with source code is completely established.

Partial: Indicates that connection with source code is not completely established, yet.

Assigned to: Developer or tester to whom this test scenario is assigned.

FIG. 17 shows an exemplary Test Cases for this Test Scenario section, according to one embodiment of the present invention. As shown, the Test cases for this Test Scenario section contains a table that lists all of the use cases that are related to the selected requirement. Following is the information listed in this table:

TC ID: Lists all of the test cases affected by the selected requirement. Click the appropriate identification name/number to open the Test Cases page shown in FIG. 21.

Author: Name of the user who created the listed test case.

Comments: Important notes pertinent to the listed test case.

Start: Date and time on which testing using the listed test case began.

Finish: Date and time on which testing using the listed test case was complete.

State: Current condition of the listed test case version. Possible statuses included:

In-progress: Not fully defined. In other words, not all use cases, test scenarios and test cases have been defined, yet. Also, a connection with all source code has not been established, yet.

Closed: All use cases, test scenarios, and test cases have been defined, tested, and passed testing. Also, no changes have been made to source code.

Retest/Reopen: An action affecting the requirement took place, for example, a new test case was created or source code was changed after the requirement was already closed.

TC Runs: Number of times that tests have been run.

Figure 18:
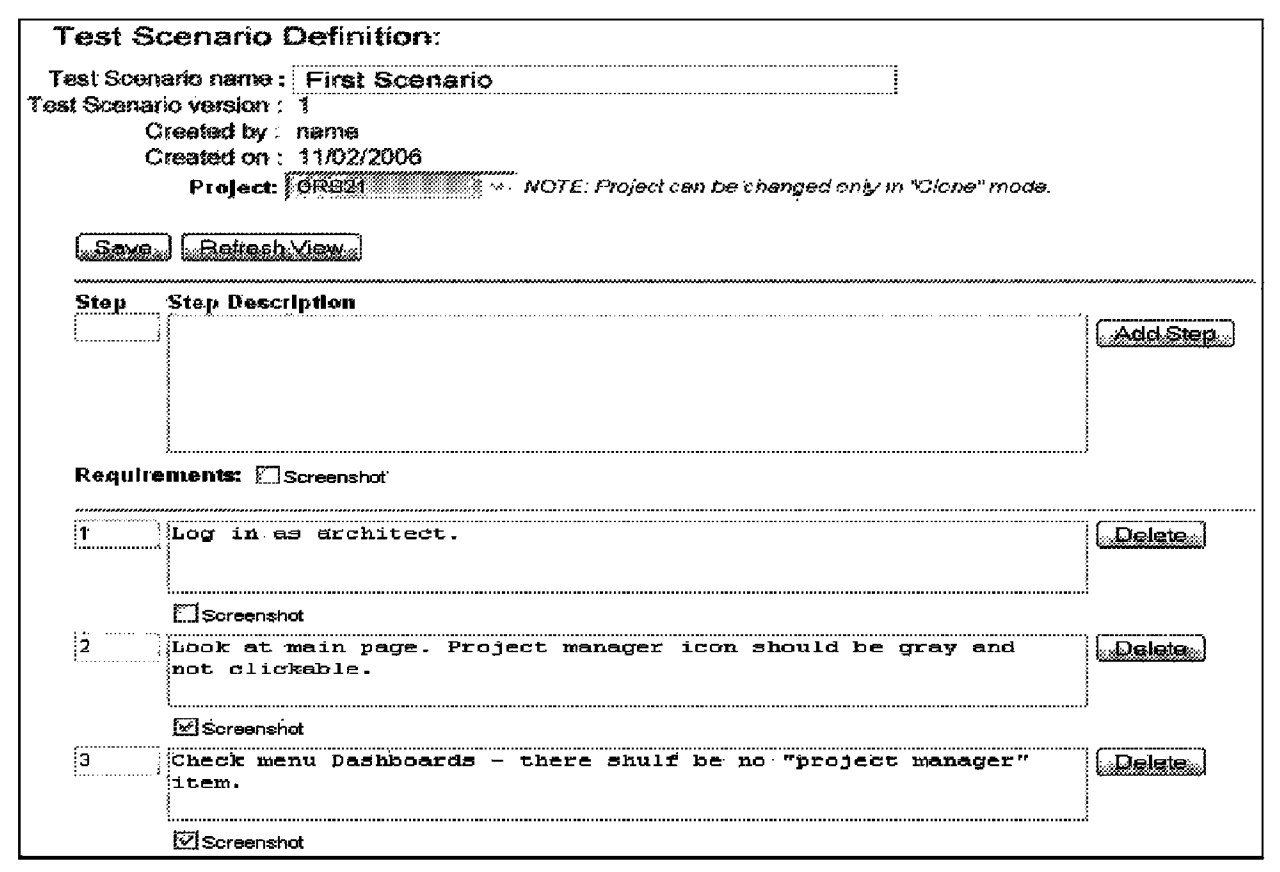

FIG. 18 depicts an exemplary Test Scenario Definition section, according to one embodiment of the present invention. The Test Scenario Definition section displays the most current version of the selected test scenario, by default. Users can change the displayed test scenario from the following locations Requirement drop-down list in the Test Scenario submenu, or Test Scenario modification description link listed in the Test Scenario Modification History section Following is the information displayed in the Test Scenario Definition section:

Test Scenario name: Descriptive title given to the displayed test scenario.

Test Scenario version: Version (modification) number of the selected test scenario.

Created by: ID of the user who created the displayed version of the test scenario.

Created on: Date and time on and at which the displayed version of the test scenario was created.

Project: Project to which the displayed test scenario version is associated.

Requirements: Step by step descriptions of how the associated use case should be tested.

In one embodiment, from the Definition section users can perform the following functions:

Make any necessary modifications to create a new test scenario definition (and, in turn, a test scenario version). This includes adding (Add Step button) and removing (Delete button) any steps that make up the displayed test scenario. Click Save to keep changes. Click Refresh View to update the information displayed on the screen based on any changes that were saved.

Figure 19:
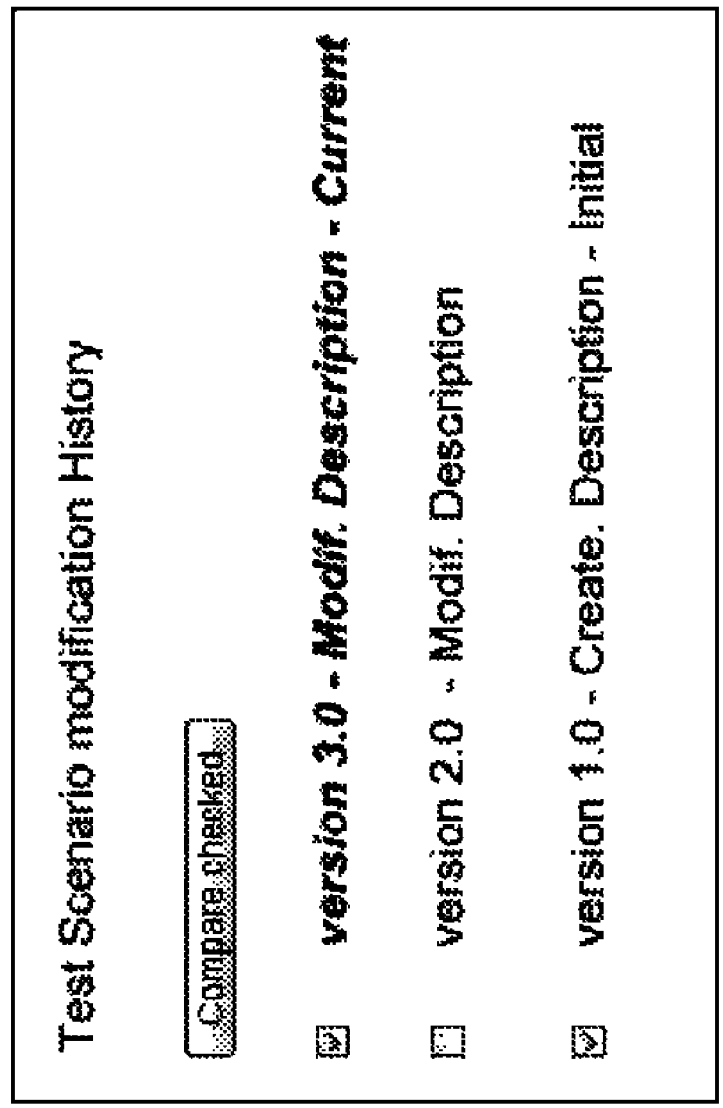
FIG. 19 illustrates an exemplary screen for Test Scenario Modification History section, according to one embodiment of the present invention.

FIG. 19 illustrates an exemplary Test Scenario Modification History section, according to one embodiment of the present invention. Any time that a test scenario is modified, the system creates a new version of that test scenario. As shown, the Test Scenario Modification History section lists all of the versions for the selected test scenario. From the Test Scenario Modification History section, users can perform the following functions:

Click a specific version (all listed versions are displayed as links) to display its definition in Test Scenario Definition section.

Select the checkboxes that correspond with two different test scenario versions to compare, and then click the Compare checked button. A page similar to one shown in FIG. 20 is displayed in which the selected versions appear side by side with differences highlighted.

Figure 21:
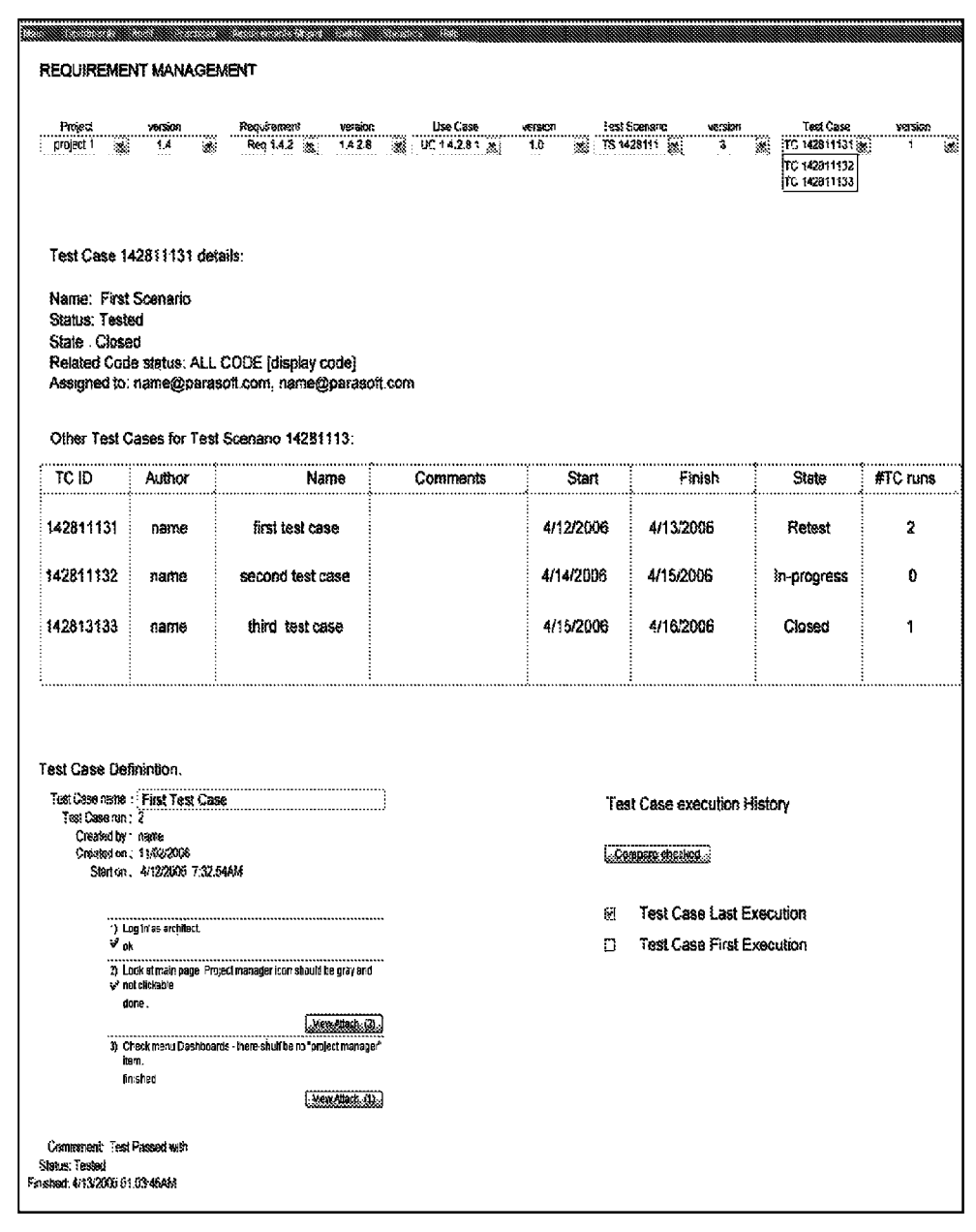

FIG. 21 depicts an exemplary Test Cases page, according to one embodiment of the present invention. Test cases are step-by-step accounts of how use cases based off test scenarios are actually tested. As shown, the Test Cases page is made up of the following sections: Test Cases Details, Other Test Cases for the given Test Scenario, Test Case Definition, and Test Case Execution History.

An exemplary Test Cases Details section is shown in FIG. 22. Based on the project, requirement, use case, test scenario, test case selected from the Requirements Management submenu, the Test Case Details section lists the following information:

Name: Descriptive title given to the displayed test case.
 Status: Current condition of the selected feature/bug. Possible statuses include Unresolved, Updated, and Tested.
 State: Current condition of the displayed test case version. Possible statuses include:
  In-progress: Not fully defined. In other words, not all use cases, test scenarios and test cases have been defined, yet. Also, a connection with all source code has not been established, yet.
  Closed: All use cases, test scenarios, and test cases have been defined, tested, and passed testing. Also, no changes have been made to source code.
  Retest/Reopen: An action affecting the requirement took place, for example, source code was changed after the requirement was already closed.
 Related Code Status: Code that is affected by the modifications listed in the Test Case Modification History section. Click the "display code" link to open a list of all files, methods, and classes that are affected by the displayed test case modifications. Following are the two possible code statuses:
  All: Indicates that connection with source code is completely established.
  Partial: Indicates that connection with source code is not completely established, yet.
 Assigned to: Developer or tester to whom this test case is assigned.

FIG. 23 shows an exemplary Other Test Cases for the given Test Scenario, according to one embodiment of the present invention. As depicted, the Other Test Cases for the given Test Scenario section contains a table that lists all of the use cases that are related to the selected requirement. Following is some information listed in this table:

TC ID: Test cases affected by the selected requirement, including the test case selected from the Requirements Management submenu. Click the appropriate identification name/number to open the Test Cases page shown in FIG. 21.
 Author: Name of the user who created the listed test case.
 Name: Name of the listed test case.
 Comments: Important notes pertinent to the listed test case.
 Start: Date and time on which testing using the listed test case began.
 Finish: Date and time on which testing using the listed test case was complete.
 State: Current condition of the listed test case version. Possible statuses included:
  In-progress: Not fully defined. In other words, not all use cases, test scenarios and test cases have been defined, yet. Also, a connection with all source code has not been established, yet.
  Closed: All use cases, test scenarios, and test cases have been defined, tested, and passed testing. Also, no changes have been made to source code.
  Retest/Reopen: An action affecting the requirement took place, for example, source code was changed after the requirement was already closed.
 #TC Runs: Number of times that tests have been run.

FIG. 24 shows an exemplary Test Case Definition section, according to one embodiment of the present invention. The Test Case Definition section displays the most current version of the selected test case, by default. Users can change the displayed test case from the following locations Test Case drop-down list in the Requirement, Management submenu, or Test Case modification description link listed in the Test Case Modification History section.

Figures 25, 26:
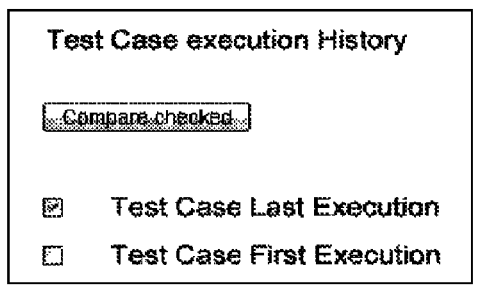
FIG. 25 shows an exemplary screen for Test Case Execution History section, according to one embodiment of the present invention.
FIG. 26 depicts an exemplary screen for Related Code page, according to one embodiment of the present invention.

From the Test Case Definition section, users can preview the run selected in the Runs History section shown in FIG. 25. In addition, the following information is displayed for the selected test case:

Test Case name: Descriptive title given to the displayed test case.
 Test Case version: Version (modification) number of the selected test case.
 Created by: ID of the user who created the displayed version of the test case.
 Created on: Date and time on and at which the displayed version of the test case was created.
 Start on: Date on which testing using the selected test cased began.
 All steps included in the displayed test case version are listed, along with attachments which can be opened for viewing by clicking the View Attach button.
 Comment: Any pertinent information associated with the displayed test case.
 Status: Current condition of the displayed test case. Various statuses included the following Not Tested, Tested, and In Progress.
 Finished: Date and time on which testing using the displayed test case version was completed.

Any time that a test case is modified, the system creates a new version of that test case. The Test Case Execution History section shown in FIG. 25 lists all of the versions for the selected test case. From the Test Case Execution History section, users can perform the following functions:

Click a specific version (all listed versions are displayed as links) to display its definition in Test Case Definition section.
 Select the checkboxes that correspond with two different test case versions to compare, and then click the Compare checked button. A page similar to one shown in FIG. 20 is displayed in which the selected versions appear side by side with differences highlighted.

FIG. 26 depicts an exemplary Related Code page, according to one embodiment of the present invention. As shown, the Related Code page is displayed when users click the "display code" link from in the Details section of any Requirements Management page (for Requirements, Use Cases, Test Scenarios, or Test Cases). The code information displayed is based on the link that was clicked.

For example, if a user is viewing a specific requirement on the Requirements page and then clicks on the "display code" link, the code information displayed is relative to the entire requirement. On the other hand, if the user is viewing a specific test case for that same requirement from the Test Case page and then clicks the "display code" link, the code information is relative to only that test case, making for much less code. The table on the Related Code page lists the following information:

- Filename: Lists files that contain source code for the displayed requirement/use case/test scenario/test case. Files are only listed if the FR/PR ID is included as a comment in the source code. This information can also be obtained from tests coverage by other test tools.
- Class: Lists all classes associated with each listed file.
- Method/Function: Lists all methods/functions associated with each listed file.
- To do: Lists testing status of the corresponding file/class/method. Statuses include:
  - OK: Tests for the corresponding file/class/method passed.
  - Retest: Tests for the corresponding file/class/method did not pass and must be retested. As mentioned above, any files/classes/methods associated with the same requirement must be retested, as well—even if they have an OK status.
- Location: Path to the corresponding file/class/function. Click to open the Related Code Comparison page. See "Related Code Comparison".

If any associated files/classes/methods for the displayed requirement need to be retested, then all need to be retested. This is due to the direct affect that each file/class/method has on one another. In one embodiment, FR/PR IDs need to be included in the source code as a comment to be listed in the Related Code table. This information can also be obtained from tests coverage by other test tools. If neither form of data is available, the files/classes/methods for the requirement cannot be included in the Related Code Comparison table, thus code comparison cannot be performed.

Figure 27:
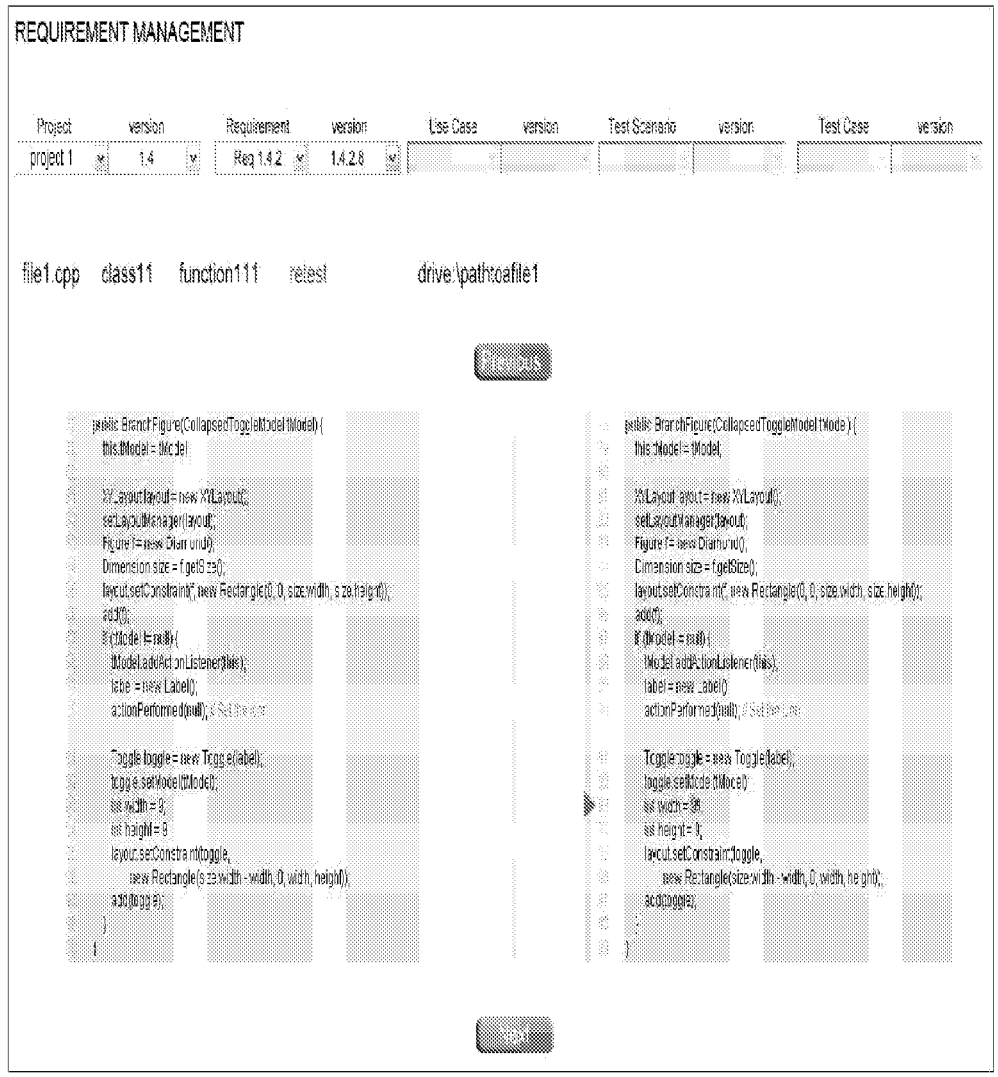
FIG. 27 illustrates an exemplary screen for Related Code Comparison page, according to one embodiment of the present invention.

FIG. 27 illustrates an exemplary Related Code Comparison page, according to one embodiment of the present invention. As depicted, the Related Code Comparison page is displayed when users click a path location link from the Related Code table. The file/class/function of the code being viewed is displayed at the top of the page. The code displayed on the left side of the screen is the last code that tested OK. The code on the right is the current code with changes. All differences between the two pieces of code are highlighted. The green arrow next to the code on the right indicates the location of the change. Some available buttons include Previous (click to go to the previous change in the code) and Next (click to go to the next change in the code).

FIG. 28 shows an exemplary Change Base Testing page, according to one embodiment of the present invention. The Change Base Testing page provides a list of all test cases that need to be retested due to source code changes. To open the page, select Requirements Management>Change Base Testing. Users can select a project, and then view the following information for that project:

- FR: Feature/requirement or bug IDs that must be tested.
- Use Case: Use case IDs that must be tested.
- Test Scenario: Test scenario IDs that must be tested.
- Test Case: Test case IDs that must be tested.
- Assigned to: User ID of the developer or tester assigned to the test case to be tested.
- File Name: Names of files that contains source code that has been modified.
- Class: Class IDs that contain source code that has been modified.
- Method/Function: Method/function IDs that contain source code that has been modified.
- Last Test Duration: Total amount of time spent testing the listed test case-specific to the listed method/function.
- Total: For the following columns, reflects the total number of different IDs or testers:
  FR•Assigned to
  Use Case•File Name
  Test Scenario•Class
  Test Case•Method/Function
  For Last Test duration, Total reflects the total number of days/hours/minutes spent testing the selected project version.

FIG. 29 depicts an exemplary Planning page, according to one embodiment of the present invention. The Planning page provides users with the ability to ask, "What if?" From this page users can select a specific project version, and then specify a specific function, method, class, or file. The system lists all test cases that will need to be retested if the user chooses to modify the specified function/method/class/file. The Planning page is displayed by choosing Requirements Management>Planning.

Users can select a specific version of a project for which to scope changes, and then view the following affected information for that project:

- FR: Feature/requirement or bug IDs that contain source code that will need to be tested.
- Use Case: Use case IDs that contain source code that will need to be tested.
- Test Scenario: Test scenario IDs that contain source code that will need to be tested.
- Test Case: Test case IDs that contain source code that will need to be tested.
- Assigned to: User ID of the developer or tester assigned to the test case that will need to be tested.
- File Name: Names of files that contain source code that user wants to modify.
- Class: Class IDs that contain source code that user wants to modify.
- Method/Function: Method/function IDs that contain source code that user wants to modify.
- Last Test Duration: Total amount of time that has been spent testing the listed test case—specific to the listed method/function.
- Total: For the following columns, reflects the total number of different IDs or testers that will be affected by the proposed test case change:
  FR•Assigned to
  Use Case•File Name
  Test Scenario•Class
  Test Case•Method/Function
  For Last Test duration, Total reflects the total number of days/hours/minutes that has been spent testing the selected project version so far.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A method for assessing effect of a change in a computer software including a plurality of requirements, the method comprising:
    storing a plurality of test cases for testing one or more of the requirements, in a computer memory;
    changing a requirement from the plurality of requirements;
    electronically correlating the computer software with the changed requirement to identify a portion of the computer software that is affected by the changed requirement;
    accessing the computer memory;
    electronically correlating one or more of the test cases with the portion of the computer software that is affected to identify one or more of the test cases that is affected by the changed requirement;
    modifying the affected one or more of the test cases to cover testing of the changed requirement; and
    executing on a computer the modified one or more of the test cases to test the computer software.

2. The method of claim 1, further comprising displaying a history of the changed requirement on a display.

3. The method of claim 1, further comprising displaying a history of the modified test cases on a display.

4. The method of claim 1, further comprising displaying a history of the executed test cases on a display.

5. The method of claim 1, further comprising electronically comparing different versions of the changed requirement and displaying the comparing results on a display.

6. The method of claim 1, further comprising displaying the portion of the computer software that is affected by the changed requirement on a display.

7. A method for assessing effect of a change in a computer software including a plurality of requirements, the method comprising:
    storing a plurality of test cases for testing one or more of the requirements, in a computer memory;
    changing a portion of the computer software;
    electronically correlating the changed portion of the computer software with one or more requirements to identify which requirements are affected by the changed portion of the computer software; and
    electronically correlating the changed portion of the computer software with one or more of the test cases to identify which test cases are affected by the changed portion of the computer software.

8. The method of claim 7, further comprising modifying the affected one or more of the test cases to cover the changed requirement.

9. The method of claim 7, further comprising executing the modified one or more of the test cases to test the changed portion of the computer software.

10. The method of claim 7, further comprising displaying a history of the changed portion of the computer software on a display.

11. The method of claim 8, further comprising displaying a history of the modified test cases on a display.

12. The method of claim 9, further comprising displaying a history of the executed test cases on a display.

13. The method of claim 7, further comprising electronically comparing different versions of the changed requirement and displaying the comparing results on a display.

14. A method for assessing effect of a change in a computer program, the method comprising:
    providing a plurality of requirements for the computer program for obtaining a desired test coverage;
    storing, in a computer memory, a plurality of test cases related to the computer program to test the requirements;
    modifying a requirement from the plurality of requirements;
    accessing the computer memory; and
    electronically identifying one or more test cases from the plurality of test cases stored in the computer memory, and one or more requirements from the plurality of requirements that are affected by the modified requirement.

15. The method of claim 14, further comprising modifying the identified one or more of the test cases to cover the changed requirement.

16. The method of claim 14, further comprising modifying the identified one or more requirements to correspond to the changed requirement.

17. The method of claim 14, further comprising executing the modified one or more of the test cases on a computer to test the changed portion of the computer software.

18. The method of claim 14, further comprising displaying a history of the modified test cases on a display.

* * * * *